US007807079B2

(12) United States Patent
Rausch et al.

(10) Patent No.: US 7,807,079 B2
(45) Date of Patent: Oct. 5, 2010

(54) METHOD OF FORMING ORIFICE PLATE FOR FLUID EJECTION DEVICE

(75) Inventors: John Rausch, Boise, ID (US); Kevin Brown, Boise, ID (US); Rio Rivas, Corvallis, OR (US)

(73) Assignee: Hewlett-Packard Development Company, L.P., Houston, TX (US)

(*) Notice: Subject to any disclaimer, the term of this patent is extended or adjusted under 35 U.S.C. 154(b) by 1116 days.

(21) Appl. No.: 11/030,036

(22) Filed: Jan. 5, 2005

(65) Prior Publication Data

US 2005/0110188 A1 May 26, 2005

Related U.S. Application Data

(62) Division of application No. 10/691,816, filed on Oct. 23, 2003, now Pat. No. 6,857,727.

(51) Int. Cl.
*B29C 41/20* (2006.01)
*B29C 41/22* (2006.01)

(52) U.S. Cl. ....................... 264/138; 264/139; 264/154; 264/255; 264/484

(58) Field of Classification Search ....................... None
See application file for complete search history.

(56) References Cited

U.S. PATENT DOCUMENTS 4,513,298 A 4/1985 Scheu
4,558,333 A 12/1985 Sugitani et al.
4,694,308 A * 9/1987 Chan et al. .................... 347/65
4,716,423 A 12/1987 Chan et al.
4,829,319 A 5/1989 Chan et al.
4,847,630 A * 7/1989 Bhaskar et al. ............... 347/63
4,885,830 A 12/1989 Ohtaka
5,167,776 A * 12/1992 Bhaskar et al. ............... 205/75
5,229,785 A * 7/1993 Leban ......................... 347/47
5,350,616 A 9/1994 Pan et al.
5,900,892 A 5/1999 Mantell et al.
6,142,607 A 11/2000 Takata et al.
6,345,880 B1 2/2002 DeBoer et al.
6,375,313 B1 4/2002 Adavikolanu et al.
6,460,970 B1 10/2002 Ohkuma et al.
6,612,032 B1 9/2003 Murthy et al.

FOREIGN PATENT DOCUMENTS

| | | |
|---|---|---|
| EP | 0629504 | 12/1994 |
| EP | 0899110 | 3/1999 |
| EP | 1332879 | 8/2003 |
| EP | 04255816.3-1251 | 1/2005 |

* cited by examiner

*Primary Examiner*—Edmund H. Lee

(57) ABSTRACT

A method of forming an orifice plate for a fluid ejection device includes depositing and patterning a mask material on a conductive surface, forming a first layer on the conductive surface, forming a second layer on the first layer, and removing the first layer and the second layer from the conductive surface, wherein the first layer includes a metallic material and the second layer includes a polymer material.

25 Claims, 4 Drawing Sheets

METHOD OF FORMING ORIFICE PLATE FOR FLUID EJECTION DEVICE

CROSS-REFERENCE TO RELATED APPLICATIONS

This application is a Divisional of U.S. patent application Ser. No. 10/691,816, filed on Oct. 23, 2003, now U.S. Pat. No. 6,857,727, which is incorporated herein by reference.

BACKGROUND

An inkjet printing system, as one embodiment of a fluid ejection system, may include a printhead, an ink supply which supplies liquid ink to the printhead, and an electronic controller which controls the printhead. The printhead, as one embodiment of a fluid ejection device, ejects drops of ink through a plurality of nozzles or orifices and toward a print medium, such as a sheet of paper, so as to print onto the print medium. Typically, the orifices are arranged in one or more arrays such that properly sequenced ejection of ink from the orifices causes characters or other images to be printed upon the print medium as the printhead and the print medium are moved relative to each other.

The orifices are often formed in an orifice layer or orifice plate of the printhead. The profile, size, and/or spacing of the orifices in the orifice plate influences the quality of an image printed with the printhead. For example, the size and spacing of the orifices influences a resolution, often measured as dots-per-inch (dpi), of the printhead and, therefore, a resolution or dpi of the printed image. Thus, consistent or uniform formation of the orifice plate is desirable.

Known fabrication techniques for orifice plates include electroformation and laser ablation. Unfortunately, high resolution orifice plates formed by electroformation are exceedingly thin, thereby creating other manufacturing and/or design issues. In addition, laser ablation of orifice plates often produces orifice plates with inconsistent or non-uniform orifice profiles such that the quality of images printed with printheads including such orifice plates is degraded.

For these and other reasons, a need exists for the present invention.

SUMMARY

One aspect of the present invention provides a method of forming an orifice plate for a fluid ejection device. The method includes depositing and patterning a mask material on a conductive surface, forming a first layer on the conductive surface, forming a second layer on the first layer, and removing the first layer and the second layer from the conductive surface, wherein the first layer includes a metallic material and the second layer includes a polymer material.

Another aspect of the present invention provides a method of forming an orifice plate for a fluid ejection device. The method includes depositing and patterning a mask material on a surface, forming a first layer on the surface, and forming a second layer on the first layer. Forming the first layer includes forming the first layer over a portion of the mask material and providing at least one opening through the first layer to the mask material. Forming the second layer includes depositing a material over the first layer and within the at least one opening of the first layer, and patterning the material to define at least one opening through the second layer and the first layer to the mask material.

Another aspect of the present invention provides an orifice plate for a fluid ejection device. The orifice plate includes a first layer formed of a metallic material and a second layer formed of a polymer material. The first layer has a first side and a second side opposite the first side, and has an orifice defined in the first side thereof and a first opening defined in the second side thereof such that the first opening communicates with the orifice. The second layer has a second opening defined therethrough and is disposed on the second side of the first layer such that the second opening communicates with the first opening. In addition, a diameter of the orifice and a diameter of the second opening are both greater than a minimum diameter of the first opening.

Another aspect of the present invention provides a fluid ejection device. The fluid ejection device includes a substrate having a fluid opening formed therethrough, a drop generator formed on the substrate, and an orifice plate extended over the drop generator. The orifice plate includes a first layer formed of a metallic material and a second layer formed of a polymer material such that the first layer has an orifice and a first opening communicated with the orifice formed therein, and the second layer has a second opening communicated with the first opening formed therein. In addition, a diameter of the orifice and a diameter of the second opening are both greater than a minimum diameter of the first opening.

DETAILED DESCRIPTION

In the following detailed description, reference is made to the accompanying drawings which form a part hereof, and in which is shown by way of illustration specific embodiments in which the invention may be practiced. In this regard, directional terminology, such as “top,” “bottom,” “front,” “back,” “leading,” “trailing,” etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
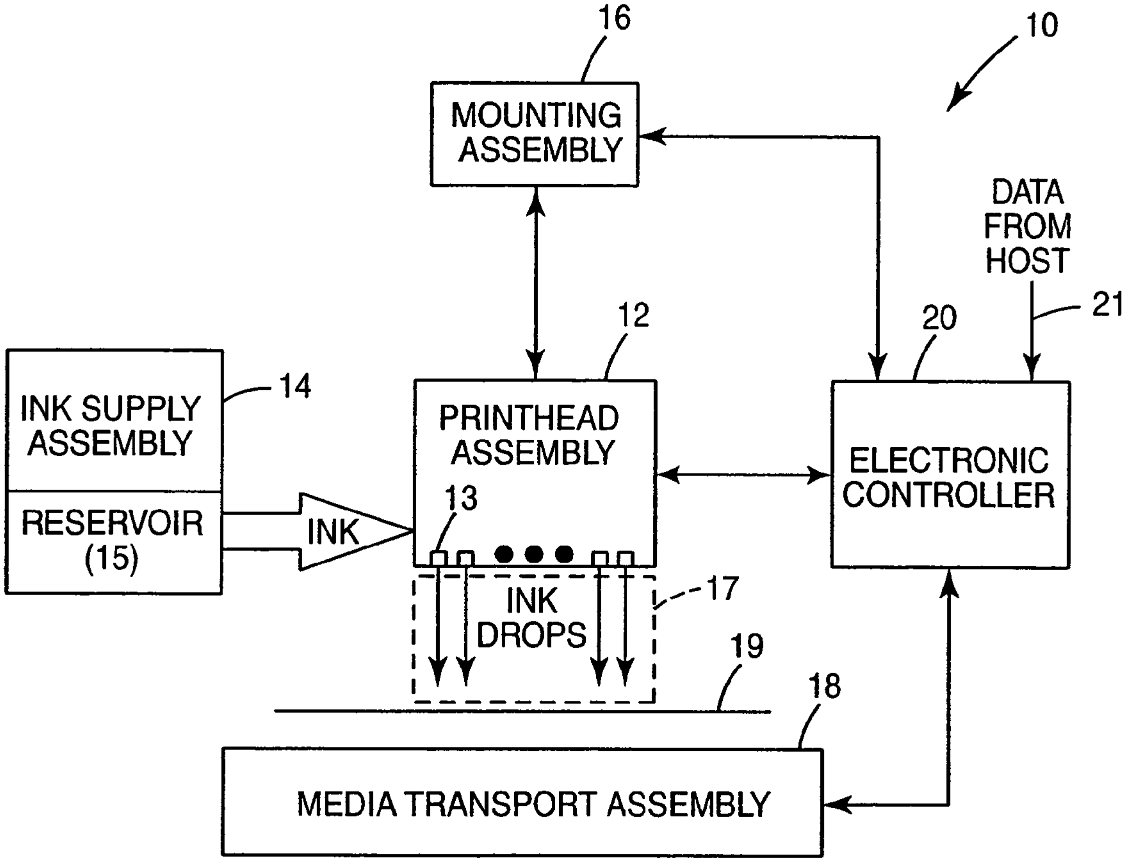
FIG. 1 is block diagram illustrating one embodiment of an inkjet printing system according to the present invention.

FIG. 1 illustrates one embodiment of an inkjet printing system 10 according to the present invention. Inkjet printing system 10 constitutes one embodiment of a fluid ejection system which includes a fluid ejection assembly, such as a printhead assembly 12, and a fluid supply assembly, such as an ink supply assembly 14. In the illustrated embodiment, inkjet printing system 10 also includes a mounting assembly 16, a media transport assembly 18, and an electronic controller 20.

Printhead assembly 12, as one embodiment of a fluid ejection assembly, is formed according to an embodiment of the present invention and ejects drops of ink, including one or more colored inks, through a plurality of orifices or nozzles 13. While the following description refers to the ejection of ink from printhead assembly 12, it is understood that other liquids, fluids, or flowable materials may be ejected from printhead assembly 12.

In one embodiment, the drops are directed toward a medium, such as print media 19, so as to print onto print media 19. Typically, nozzles 13 are arranged in one or more columns or arrays such that properly sequenced ejection of ink from nozzles 13 causes, in one embodiment, characters, symbols, and/or other graphics or images to be printed upon print media 19 as printhead assembly 12 and print media 19 are moved relative to each other.

Print media 19 includes, for example, paper, card stock, envelopes, labels, transparencies, Mylar, fabric, and the like. In one embodiment, print media 19 is a continuous form or continuous web print media 19. As such, print media 19 may include a continuous roll of unprinted paper.

Ink supply assembly 14, as one embodiment of a fluid supply assembly, supplies ink to printhead assembly 12 and includes a reservoir 15 for storing ink. As such, ink flows from reservoir 15 to printhead assembly 12. In one embodiment, ink supply assembly 14 and printhead assembly 12 form a recirculating ink delivery system. As such, ink flows back to reservoir 15 from printhead assembly 12. In one embodiment, printhead assembly 12 and ink supply assembly 14 are housed together in an inkjet or fluidjet cartridge or pen. In another embodiment, ink supply assembly 14 is separate from printhead assembly 12 and supplies ink to printhead assembly 12 through an interface connection, such as a supply tube (not shown).

Mounting assembly 16 positions printhead assembly 12 relative to media transport assembly 18, and media transport assembly 18 positions print media 19 relative to printhead assembly 12. As such, a print zone 17 within which printhead assembly 12 deposits ink drops is defined adjacent to nozzles 13 in an area between printhead assembly 12 and print media 19. Print media 19 is advanced through print zone 17 during printing by media transport assembly 18.

In one embodiment, printhead assembly 12 is a scanning type printhead assembly, and mounting assembly 16 moves printhead assembly 12 relative to media transport assembly 18 and print media 19 during printing of a swath on print media 19. In another embodiment, printhead assembly 12 is a non-scanning type printhead assembly, and mounting assembly 16 fixes printhead assembly 12 at a prescribed position relative to media transport assembly 18 during printing of a swath on print media 19 as media transport assembly 18 advances print media 19 past the prescribed position.

Electronic controller 20 communicates with printhead assembly 12, mounting assembly 16, and media transport assembly 18. Electronic controller 20 receives data 21 from a host system, such as a computer, and includes memory for temporarily storing data 21. Typically, data 21 is sent to inkjet printing system 10 along an electronic, infrared, optical or other information transfer path. Data 21 represents, for example, a document and/or file to be printed. As such, data 21 forms a print job for inkjet printing system 10 and includes one or more print job commands and/or command parameters.

In one embodiment, electronic controller 20 provides control of printhead assembly 12 including timing control for ejection of ink drops from nozzles 13. As such, electronic controller 20 defines a pattern of ejected ink drops which form characters, symbols, and/or other graphics or images on print media 19. Timing control and, therefore, the pattern of ejected ink drops, is determined by the print job commands and/or command parameters. In one embodiment, logic and drive circuitry forming a portion of electronic controller 20 is located on printhead assembly 12. In another embodiment, logic and drive circuitry forming a portion of electronic controller 20 is located off printhead assembly 12.

Figure 2:
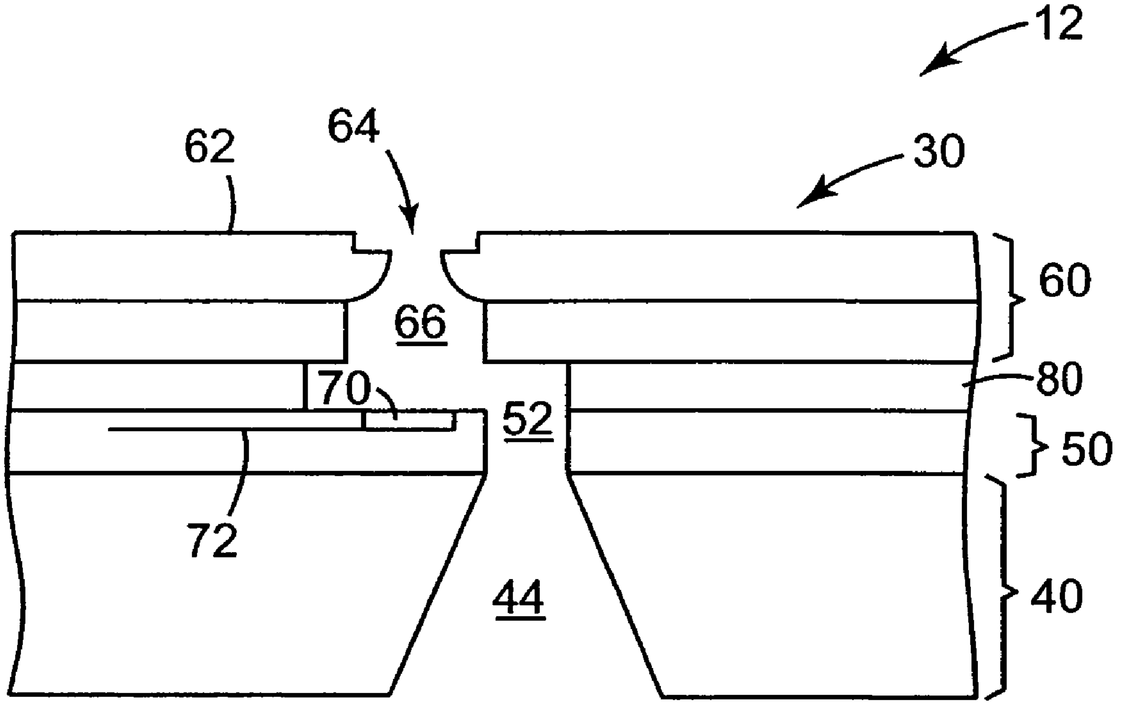
FIG. 2 is a schematic cross-sectional view illustrating one embodiment of a portion of a fluid ejection device according to the present invention.

FIG. 2 illustrates one embodiment of a portion of printhead assembly 12. Printhead assembly 12, as one embodiment of a fluid ejection assembly, includes an array of drop ejecting elements 30. Drop ejecting elements 30 are formed on a substrate 40 which has a fluid (or ink) feed slot 44 formed therein. As such, fluid feed slot 44 provides a supply of fluid (or ink) to drop ejecting elements 30.

In one embodiment, each drop ejecting element 30 includes a thin-film structure 50, an orifice plate 60, and a drop generator, such as a firing resistor 70. Thin-film structure 50 has a fluid (or ink) feed channel 52 formed therein which communicates with fluid feed slot 44 of substrate 40. Orifice plate 60 has a front face 62 and a nozzle opening 64 formed in front face 62. In one embodiment, orifice plate 60 is a multi-layered orifice plate, as described below.

Orifice plate 60 also has a nozzle chamber 66 formed therein which communicates with nozzle opening 64 and fluid feed channel 52 of thin-film structure 50. Firing resistor 70 is positioned within nozzle chamber 66 and includes leads 72 which electrically couple firing resistor 70 to a drive signal and ground.

In one embodiment, each drop ejecting element 30 also includes a bonding layer 80. Bonding layer 80 is supported by thin-film structure 50 and interposed between thin-film structure 50 and orifice plate 60. As such, fluid (or ink) feed channel 52 is formed in thin-film structure 50 and bonding layer 80. Bonding layer 80 may include, for example, a polymer material or an adhesive such as an epoxy. Accordingly, in one embodiment, orifice plate 60 is supported by thin-film structure 50 by being adhered to bonding layer 80.

In one embodiment, during operation, fluid flows from fluid feed slot 44 to nozzle chamber 66 via fluid feed channel 52. Nozzle opening 64 is operatively associated with firing resistor 70 such that droplets of fluid are ejected from nozzle chamber 66 through nozzle opening 64 (e.g., normal to the plane of firing resistor 70) and toward a print medium upon energization of firing resistor 70.

Example embodiments of printhead assembly 12 include a thermal printhead, a piezoelectric printhead, a flex-tensional printhead, or any other type of fluid ejection device known in the art. In one embodiment, printhead assembly 12 is a fully integrated thermal inkjet printhead. As such, substrate 40 is formed, for example, of silicon, glass, or a stable polymer, and thin-film structure 50 includes one or more passivation or insulation layers formed, for example, of silicon dioxide, silicon carbide, silicon nitride, tantalum, poly-silicon glass, or other material. Thin-film structure 50 also includes a conductive layer which defines firing resistor 70 and leads 72. The conductive layer is formed, for example, by aluminum, gold, tantalum, tantalum-aluminum, or other metal or metal alloy.

FIGS. 3A-3H illustrate one embodiment of forming an orifice plate 100 for a fluid ejection device, such as printhead assembly 12. In one embodiment, orifice plate 100 constitutes orifice plate 60 of drop ejecting element 30 (FIG. 2). As such, orifice plate 100 is supported by thin-film structure 50 and extended over firing resistor 70. In addition, orifice plate 100 includes orifices 102 (FIG. 3G) which constitute nozzle opening 64 and fluid chambers 104 (FIG. 3G) which constitute nozzle chamber 66 of a respective drop ejecting element 30. While orifice plate 100 is illustrated as being formed with two orifices, it is understood that any number of orifices may be formed in orifice plate 100.

Figure 3A:
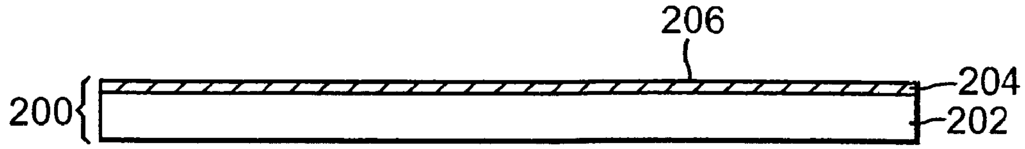
FIGS. 3A-3H illustrate one embodiment of forming an orifice plate for a fluid ejection device according to the present invention.

In one embodiment, as illustrated in FIG. 3A, orifice plate 100 is formed on a mandrel 200. Mandrel 200 includes a substrate 202 and a seed layer 204 formed on a side of substrate 202. In one embodiment, substrate 202 is formed of a non-conductive material, such as glass, or a semi-conductive material, such as silicon. Seed layer 204, however, is formed of a conductive material. As such, seed layer 204 provides a conductive surface 206 on which orifice plate 100 is formed, as described below. In one embodiment, seed layer 204 may be formed of a metallic material such as, for example, stainless steel or chrome. In one embodiment, when substrate 202 is formed of silicon, seed layer 204 and, therefore, conductive surface 206 may be formed by doping substrate 202.

Figure 3B:
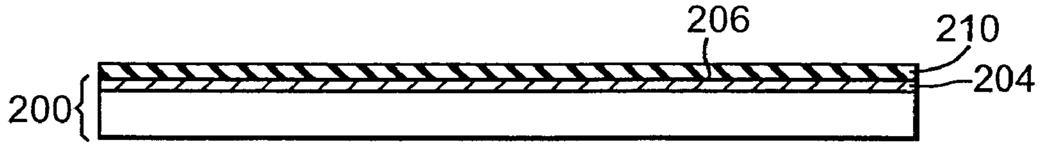

As illustrated in the embodiment of FIG. 3B, to form orifice plate 100, a mask layer 210 is formed on mandrel 200. More specifically, mask layer 210 is formed on conductive surface 206 of seed layer 204. In one embodiment, mask layer 210 is formed of an insulative material. Examples of materials that may be used for mask layer 210 include photoresist or an oxide, such as, for example, silicon nitride.

Figure 3C:
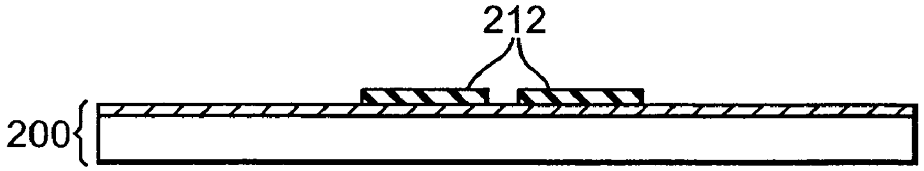

Next, as illustrated in the embodiment of FIG. 3C, mask layer 210 is patterned to define where orifices 102 (FIG. 3G) of orifice plate 100 are to be formed. In one embodiment, mask layer 210 may be patterned to define masks 212. As such, masks 212 define a dimension of the orifices to be formed in orifice plate 100, as described below. In addition, a spacing of masks 212 defines a spacing of the orifices of orifice plate 100, also as described below. Mask layer 210 is patterned, for example, by photolithography and/or etching.

Figure 3D:
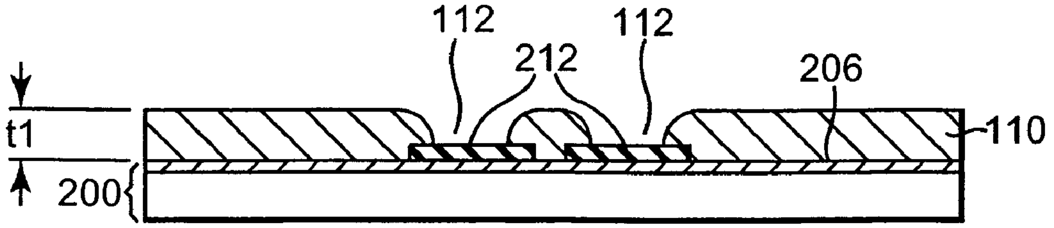

In one embodiment, as illustrated in FIG. 3D, a first layer 110 of orifice plate 100 is formed. In one embodiment, first layer 110 is formed on conductive surface 206 of mandrel 200. In one embodiment, first layer 110 may be electroformed on conductive surface 206. As such, first layer 110 may be formed by electroplating conductive surface 206 with a metallic material. Examples of materials that may be used for first layer 110 include nickel, copper, iron/nickel alloys, palladium, gold, and rhodium.

During electroplating, the metallic material of first layer 110 establishes a thickness t1 of first layer 110. In one embodiment, thickness t1 of first layer 110 is in a range of approximately 5 microns to approximately 25 microns. In one exemplary embodiment, thickness t1 of first layer 110 may be approximately 13 microns.

In one embodiment, the metallic material of first layer 110 extends in a direction substantially perpendicular to thickness t1 so as to overlap a portion of masks 212. More specifically, the metallic material of first layer 110 may be electroplated so as to overlap the edges of masks 212 and provide openings 112 through first layer 110 to masks 212 of mask layer 210. In one embodiment, the amount by which the metallic material of first layer 110 overlaps the edges of masks 212 is proportional to thickness t1. In one embodiment, for example, a one-to-one ratio is established between thickness t1 and the amount of overlap. As such, masks 212 define where orifices 102 (FIG. 3G) of orifice plate 100 are to be formed in first layer 110, as described below.

Figure 3E:
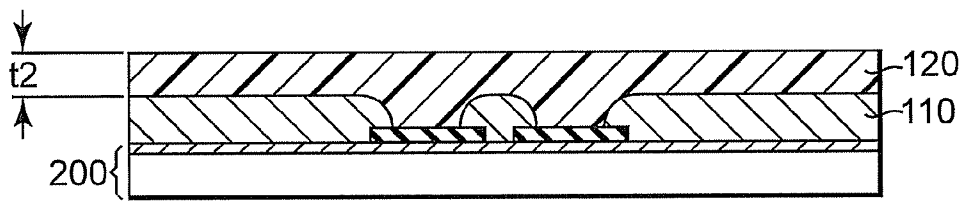

In one embodiment, as illustrated in FIG. 3E, a second layer 120 of orifice plate 100 is formed. In one embodiment, second layer 120 is formed on first layer 110. As such, second layer 120 is formed after first layer 110. In one embodiment, second layer 120 is formed by depositing a polymer material over first layer 110 and within openings 112 of first layer 110. Examples of materials that may be used for second layer 120 include a photoimageable polymer, such as SU8 available from MicroChem Corporation of Newton, Mass. or IJ5000 available from DuPont of Wilmington, Del.

The polymer material of second layer 120 is deposited to establish a thickness t2 of second layer 120. In one embodiment, thickness t2 of second layer 120 is in a range of approximately 5 microns to approximately 25 microns. In one exemplary embodiment, thickness t2 of second layer 120 may be approximately 13 microns. While second layer 120 is illustrated as including one layer of the polymer material, it is understood that second layer 120 may include one or more layers of the polymer material.

Figure 3F:
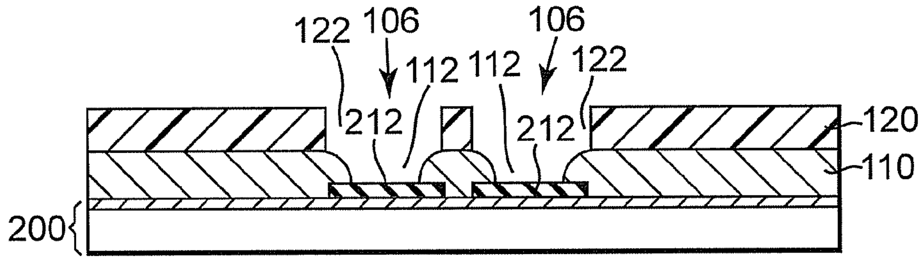

As illustrated in the embodiment of FIG. 3F, the polymer material of second layer 120 is patterned. More specifically, second layer 120 is patterned to define openings 122 through second layer 120. Second layer 120 is patterned, for example, by exposing and developing selective areas of the polymer material to define which portions or areas of the polymer material are to remain and/or which portions or areas of the polymer material are to be removed.

In one embodiment, openings 122 of second layer 120 communicate with openings 112 of first layer 110. In addition, openings 122 of second layer 120 are sized to accommodate misalignment with openings 112 of first layer 110. As such, openings 122 and 112 provide through passages or openings 106 through second layer 120 and first layer 110 to masks 212 of mask layer 210.

Figure 3G:
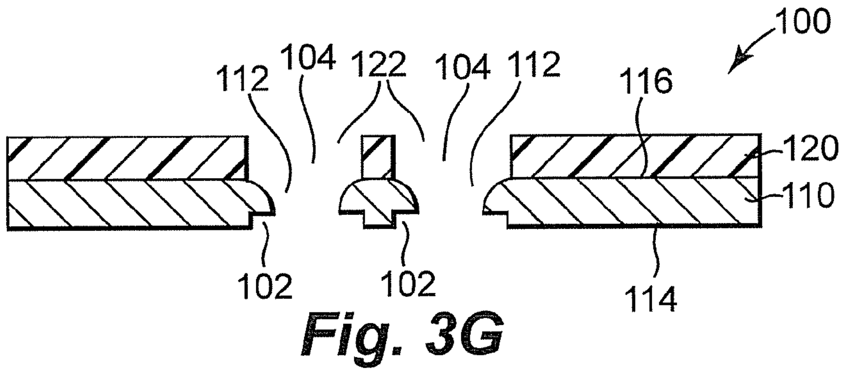

As illustrated in the embodiment of FIG. 3G, after first layer 110 and second layer 120 are formed, first layer 110 and second layer 120 are separated from mandrel 200 and mask layer 210. As such, orifice plate 100 including first layer 110 and second layer 120 is formed. First layer 110 of orifice plate 100, therefore, has a first side 114 and a second side 116 opposite first side 114 such that orifices 102 are defined in first side 114 and openings 112 which communicate with orifices 102 are defined in second side 116. In addition, second layer 120 of orifice plate 100 has openings 122 defined therethrough which communicate with openings 112 of first layer 110 and, therefore, orifices 102.

In one embodiment, orifices 102 have a dimension D1 and have a center-to-center spacing D2 relative to each other. Dimension D1 represents, for example, a diameter of orifices 102 when orifices 102 are substantially circular in shape. Orifices 102, however, may be other non-circular or pseudo-circular shapes. Dimension D1 and spacing D2 of orifices 102 are defined by the patterning of mask layer 210 and, more specifically, masks 212, as described above.

Figure 3H:
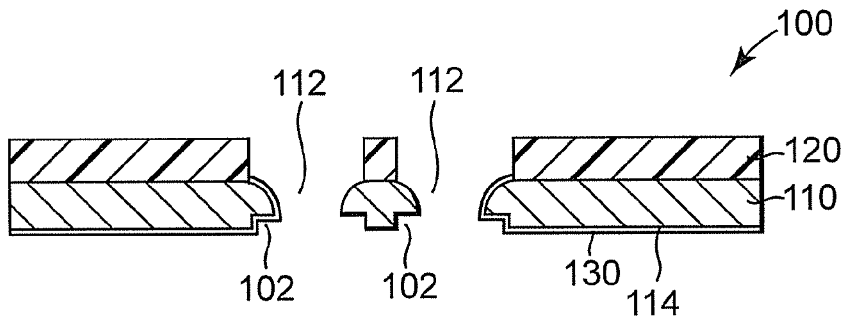

In one embodiment, as illustrated in FIG. 3H, a protective layer 130 is formed over first layer 110 of orifice plate 100. More specifically, protective layer 130 is formed on first side 114 of first layer 110 and, in one embodiment, within orifices 102 and openings 112 of first layer 110. In one embodiment, layer 130 is provided only when first layer 110 is formed, for example, of nickel, copper, or an iron/nickel alloy. As such, materials that may be used for protective layer 130 include, for example, palladium, gold, or rhodium. In one embodiment, when first layer 110 is formed, for example, of palladium, gold, or rhodium, protective layer 130 may be omitted.

In one embodiment, as described above, orifice plate 100 constitutes orifice plate 60 of drop ejecting element 30 (FIG. 2). Accordingly, orifice plate 100 is supported by thin-film structure 50 and extended over firing resistor 70 such that orifice 102 is operatively associated with firing resistor 70 and fluid chamber 104 communicates with fluid feed channel 52. As such, fluid from fluid feed slot 44 flows to fluid chamber 104 via fluid feed channel 52. Thus, orifice plate 100 is oriented such that first layer 110 provides a front face of drop ejecting element 30 and second layer 120 faces thin-film structure 50. In one embodiment, orifice plate 100 is supported by thin-film structure 50 by adhering second layer 120 to bonding layer 80.

Since first layer 110 and second layer 120 of orifice plate 100 are separate structures, characteristics of orifices 102 may be independently controlled. For example, the profile, size, and spacing of orifices 102 can be defined with first layer 110, while fluid chambers 104 and an overall thickness of orifice plate 100 can be defined with second layer 120. Thus, more consistent and/or uniform formation of orifices 102 may be provided.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method of forming an orifice plate for a fluid ejection device, the method comprising:

depositing and patterning a mask material on a conductive surface;

forming a first layer on the conductive surface, the first layer including a metallic material;

forming a second layer on the first layer, the second layer including a polymer material; and removing the first layer and the second layer from the conductive surface, wherein forming the first layer includes providing a first opening through the first layer to the mask material, and wherein forming the second layer includes depositing the polymer material over the first layer and within the first opening and forming a continuous layer of the polymer material with a substantial planar surface over the first layer and over the first opening, and further comprising providing a second opening through the second layer and removing the polymer material from within the first opening, the second opening communicated with the first opening and a minimum diameter of the second opening being greater than a minimum diameter of the first opening.

2. The method of claim 1, wherein forming the first layer includes electroforming the first layer on the conductive surface.

3. The method of claim 2, wherein electroforming the first layer includes electroplating the conductive surface with the metallic material.

4. The method of claim 1, wherein forming the first layer includes forming the first layer over a portion of the mask material.

5. The method of claim 4, wherein forming the second layer includes patterning the polymer material to define at least one opening through the second layer and the first layer to the mask material.

6. The method of claim 1, wherein forming the first layer includes defining an orifice in the first layer with the mask material and providing the first opening through the first layer to the mask material, the first opening communicated with the orifice and a dimension of the orifice being defined by the mask material.

7. The method of claim 6, wherein patterning the mask material includes defining a diameter of the orifice, wherein the diameter of the orifice is greater than the minimum diameter of the first opening.

8. The method of claim 1, wherein the metallic material of the first layer includes one of nickel, copper, an iron/nickel alloy, palladium, gold, and rhodium.

9. The method of claim 1, wherein the polymer material of the second layer includes a photoimageable polymer.

10. The method of claim 1, further comprising:

forming a protective layer over the first layer.

11. The method of claim 10, wherein the metallic material of the first layer includes one of nickel, copper, and an iron/nickel alloy, and the protective layer includes one of palladium, gold, and rhodium.

12. A method of forming an orifice plate for a fluid ejection device, the method comprising:

depositing and patterning a mask material on a surface;

forming a first layer on the surface, including forming the first layer over a portion of the mask material and providing a first opening through the first layer to the mask material; and forming a second layer on the first layer, including depositing a material over the first layer and substantially filling the first opening of the first layer with the material, and providing a second opening through the second layer and removing the material from within the first opening, the second opening communicated with the first opening to define at least one opening through the second layer and the first layer to the mask material, and a minimum diameter of the second opening being greater than a minimum diameter of the first opening.

13. The method of claim 12, wherein forming the first layer includes electroplating the surface with a metallic material.

14. The method of claim 13, wherein the metallic material includes one of nickel, copper, an iron/nickel alloy, palladium, gold, and rhodium.

15. The method of claim 12, wherein forming the second layer includes depositing a polymer material over the first layer and within the first opening of the first layer, and patterning the polymer material to define the at least one opening through the second layer and the first layer to the mask material.

16. The method of claim 15, wherein the polymer material includes a photoimageable polymer.

17. The method of claim 12, wherein forming the first layer includes defining an orifice in the first layer with the mask material and providing the first opening through the first layer to the mask material, the first opening communicated with the orifice and a dimension of the orifice being defined by the mask material.

18. The method of claim 17, wherein patterning the mask material includes defining a diameter of the orifice, wherein the diameter of the orifice is greater than the minimum diameter of the first opening.

19. The method of claim 12, further comprising:

removing the first layer and the second layer from the surface.

20. The method of claim 12, further comprising:

forming a protective layer over the first layer.

21. The method of claim 20, wherein the protective layer includes one of palladium, gold, and rhodium.

22. The method of claim 1, wherein forming the second layer includes substantially filling the first opening with the polymer material.

23. The method of claim 1, wherein providing the second opening through the second layer includes selectively removing portions of the polymer material from the continuous layer.

24. The method of claim 12, wherein forming the second layer includes forming a continuous layer of the material with a substantial planar surface over the first layer and over the first opening of the first layer.

25. The method of claim 24, wherein providing the second opening through the second layer includes selectively removing portions of the material from the continuous layer.

* * * * *